United States Patent [19]

Nakanishi et al.

[11] 4,249,245

[45] Feb. 3, 1981

[54] CONFIRMATION SOUND GENERATION FOR INDICATING EFFECTIVE KEY INPUT OPERATION

[75] Inventors: Akira Nakanishi, Sakurai; Kazumitsu Miyakoshi, Nara, both of Japan

[73] Assignee: Sharp Kabushiki Kaisha, Osaka, Japan

[21] Appl. No.: 22,378

[22] Filed: Mar. 20, 1979

[30] Foreign Application Priority Data

Mar. 24, 1978 [JP]  Japan ................................. 53-34589

[51] Int. Cl.³ ............................................ G08B 21/00
[52] U.S. Cl. ................................ 364/710; 340/365 E; 340/384 E; 340/502
[58] Field of Search ............................. 364/709, 710; 340/365 R, 365 E, 384 E, 502, 504

[56] References Cited

U.S. PATENT DOCUMENTS

| | | | |
|---|---|---|---|
| 3,624,645 | 11/1971 | Gluck et al. | 340/365 E |
| 3,893,091 | 7/1975 | Lee | 340/502 |
| 3,983,553 | 9/1976 | Kesling | 340/384 E |

*Primary Examiner*—Jerry Smith
*Attorney, Agent, or Firm*—Birch, Stewart, Kolasch & Birch

[57] ABSTRACT

A confirmation sound generation system for developing a confirmation sound upon actuation of keys included in a key input means of an electronic apparatus. A determination means is provided for determining whether the presently conducted key input operation is effective. The determination means develops a determination output for activating said confirmation sound generation system only when an effective key input operation is conducted.

7 Claims, 4 Drawing Figures

CONFIRMATION SOUND GENERATION FOR INDICATING EFFECTIVE KEY INPUT OPERATION

BACKGROUND AND SUMMARY OF THE INVENTION

The present invention relates to a key input system for an electronic apparatus such as an electronic calculator and, more particularly, to a confirmation sound generation system for indicating effective key input operation in an electronic apparatus.

An electronic calculator has been developed, which includes a sound generation system for developing a confirmation sound in response to actuation of any key included in a keyboard panel. A typical confirmation sound generation system is described in copending application, ELECTRONIC CALCULATOR WITH ACOUSTICALLY ALARMING CAPABILITIES, Ser. No. 845,977, filed Oct. 27, 1977 by Isamu Washizuka and Shintaro Hashimoto and assigned to the same assignee as the present application.

The above-mentioned key input confirmation system is very effective for an electronic calculator including minimum stroke keyboard switches such as disclosed in copending application, ELECTRONIC CALCULATOR WITH NO PROTRUDING KEY TOPS, Ser. No. 843,047 and now U.S. Pat. No. 4,158,230, filed Oct. 17, 1977 by Isamu Washizuka, Shintaro Hashimoto, Sadakatsu Hashimoto and Shigeki Komaki and assigned to the same assignee as the present application.

In the conventional confirmation sound generation system, the confirmation sound is always developed upon actuation of any key included in the keyboard panel. Therefore, the operator may advance to the following key and actuate the said key without regard to the fact that the previously conducted key input operation may not be effective or correct. This will cause erroneous key input operation.

Accordingly, an object of the present invention is to provide an improved confirmation sound generation system for an electronic apparatus including a keyboard panel.

Another object of the present invention is to provide a confirmation sound generation system for an electronic calculator in order to indicate effective key input operation.

Still another object of the present invention is to provide a novel key input system, which minimizes erroneous key input operation in an electronic apparatus.

Other objects and further scope of applicability of the present invention will become apparent from the detailed description given hereinafter. It should be understood, however, that the detailed description and specific examples, while indicating a preferred embodiment of the invention, are given by way of illustration only, since various changes and modifications within the spirit and scope of the invention will become apparent to those skilled in the art from this detailed description.

To achieve the above objects, pursuant to an embodiment of the present invention, an electronic calculator is provided with a confirmation sound generation system, and a determination system for determining whether the presently conducted key input operation is effective or correct. The confirmation sound generation system is enabled upon generation of a determination signal derived from the determination system, thereby developing the confirmation sound only when an effective key input operation is conducted.

In a preferred form, the confirmation sound will not be generated upon actuation of any key other than the error clear key in the case where the electronic calculator is placed in the error condition. In the numeral information introduction operation, the confirmation sound is generated upon actuation of numeral keys, but the confirmation sound will not be generated when the numeral keys are operated to introduce the numeral information exceeding the digit capacity of the electronic calculator.

Moreover, the confirmation sound is not generated when the function keys such as ⊠ key, ⊟ key and ▨ key are actuated without the advance introduction of the appropriate numerical information.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
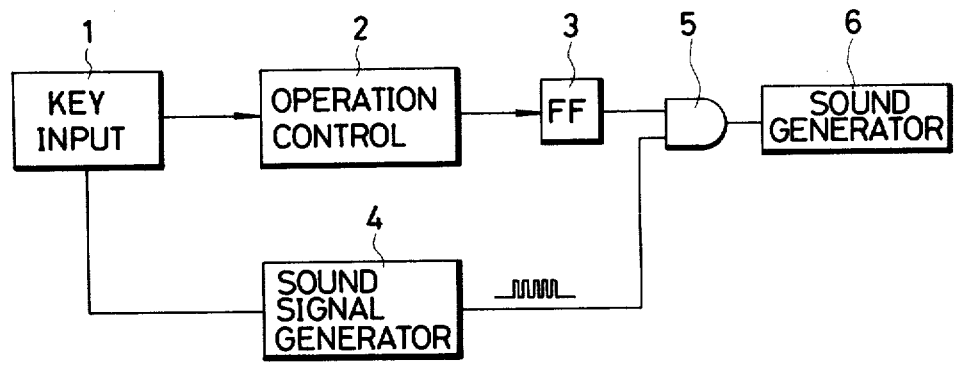
FIG. 1 is a block diagram of an embodiment of a confirmation sound generation system of the present invention.

FIG. 1 schematically shows an embodiment of a confirmation sound generation system of the present invention. In this embodiment, the confirmation sound generation system is employed in an electronic calculator.

The electronic calculator mainly comprises a key input unit 1 including numeral keys and function keys, an operation control circuit 2 for conducting an arithmetic calculation in response to numeral information and function commands introduced through the key input unit 1, and a display unit (not shown) for displaying the calculation result stored in the operation control circuit 2.

The operation control circuit 2 includes a determination unit for determining whether the now conducted key actuation is effective or not. The operation control circuit 2 for conducting the above-mentioned operation is installed in a single chip semiconductor element LI 3030 manufactured by SHARP KABUSHIKI KAISHA.

A determination output derived from the determination unit is applied to a flip-flop 3. More specifically, the flip-flop 3 is set when an effective key input operation is conducted. And the flip-flop 3 is reset when an erroneous key input operation is conducted. A sound signal generator 4 is connected to the key unit 1 for developing a sound signal of predetermined frequency for a predetermined period of time upon actuation of any key included in the key input unit 1.

A set output signal of the flip-flop 3 and the sound signal derived from the sound signal generator 4 are applied to an AND gate 5. An output signal of the AND gate 5 is applied to a sound generator 6. More specifically, when an effective key input operation is conducted, the sound generator 6 is enabled to generate a confirmation sound for predetermined period of time. When the key input operation is not effective, the sound generator 6 is not enabled and, hence, the confirmation sound is not generated.

Figure 2:
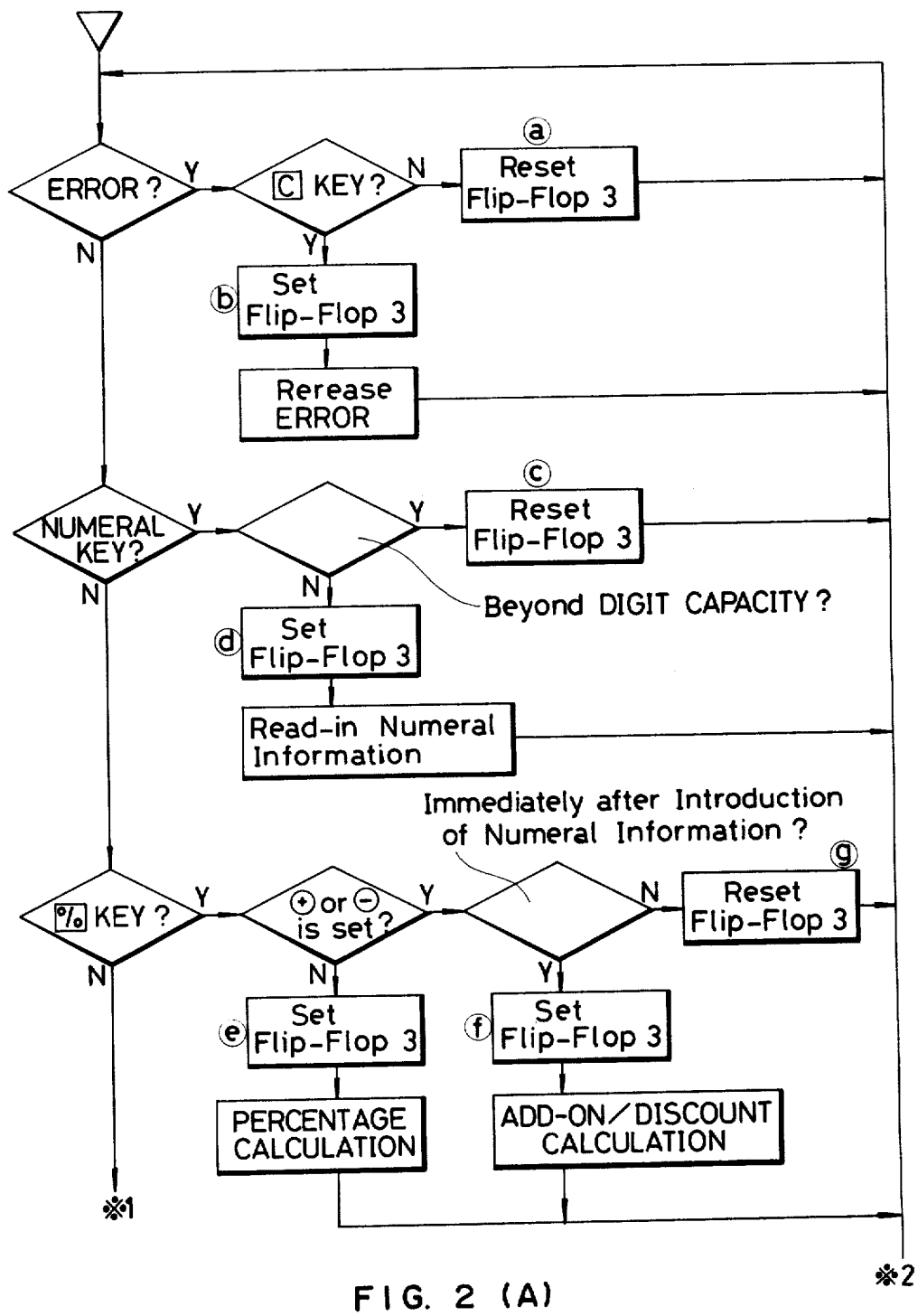
FIGS. 2(A) and 2(B) are flow charts showing operation of an operation control circuit included in the confirmation sound generation system of FIG. 1.
Figure 2:
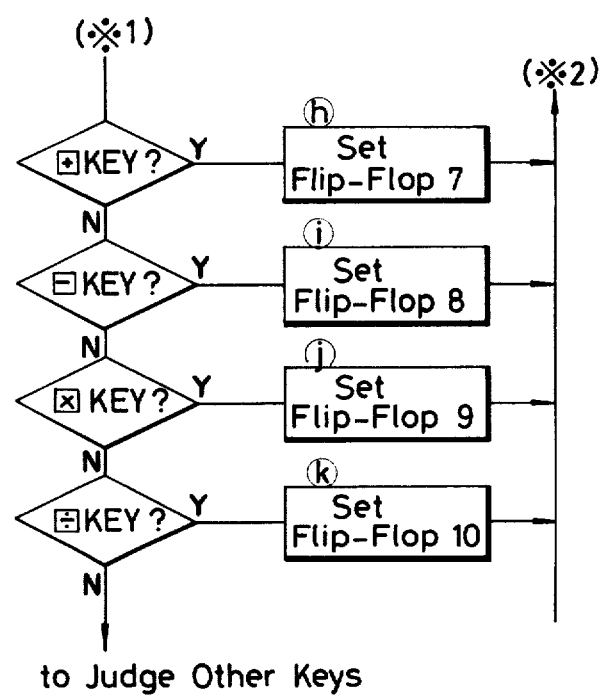

FIGS. 2(A) and 2(B) show an operation flow of the determination unit included in the operation control circuit 2.

As already discussed above, the determination unit develops the determination output for setting the flip-flop 3 when the now conducted key input operation is effective. Under these conditions, the arithmetic calculation is conducted. To the contrary, when the now conducted key input operation is not effective, the determination unit develops an error input detection signal for resetting the flip-flop 3 and precluding the arithmetic calculation.

Now assume that an add-on calculation is desired to be performed. The correct key input operation is as follows:

(1) introduce numeral information A through numeral keys;
(2) actuate the ⊞ key;
(3) introduce numeral information B through numeral keys; and, then
(4) actuate the ⅔ key The display unit displays the add-on calculation result: A + A·B/100.

The first step of the determination unit is to determine whether the electronic calculator is in the error mode. When the electronic calculator is placed in the error condition, actuation of the clear key Ⓒ is detected. When the clear key Ⓒ included in the key input unit 1 is actuated under the conditions where the electronic calculator is in the error mode, a micro-order ⓑ is developed to set the flip-flop 3. Hence, the confirmation sound is generated from the sound generator 6 upon actuation of the clear key Ⓒ in order to indicate the effective key input operation. The electronic calculator is returned to the initial condition.

To the contrary, when any key other than the clear key Ⓒ is actuated under the condition where the electronic calculator is in the error mode, a micro-order ⓐ is developed to reset the flip-flop 3. The confirmation sound is not generated and the error mode is not cleared until the clear key Ⓒ is actuated.

When the electronic calculator is placed in the initial condition, the numeral information A is introduced by utilizing the numeral keys included in the key input unit 1. Upon actuation of the numeral keys, a micro-order ⓓ is developed to set the flip-flop 3 and perform the read-in operation of the numeral information. At this moment, the confirmation sound is generated from the sound generator 6 to indicate the effective key input operation.

When the numeral keys are actuated to erroneously introducing numeral information having a number of digits exceeding the digit capacity of the electronic calculator, a micro-order ⓒ is developed to reset the flip-flop 3. Therefore, the confirmation sound is not generated upon actuation of the numeral key which introduces the digit exceeding the digit capacity of the electronic calculator. The lack of a confirmation sound indicates an ineffective key input operation.

Figure 3:
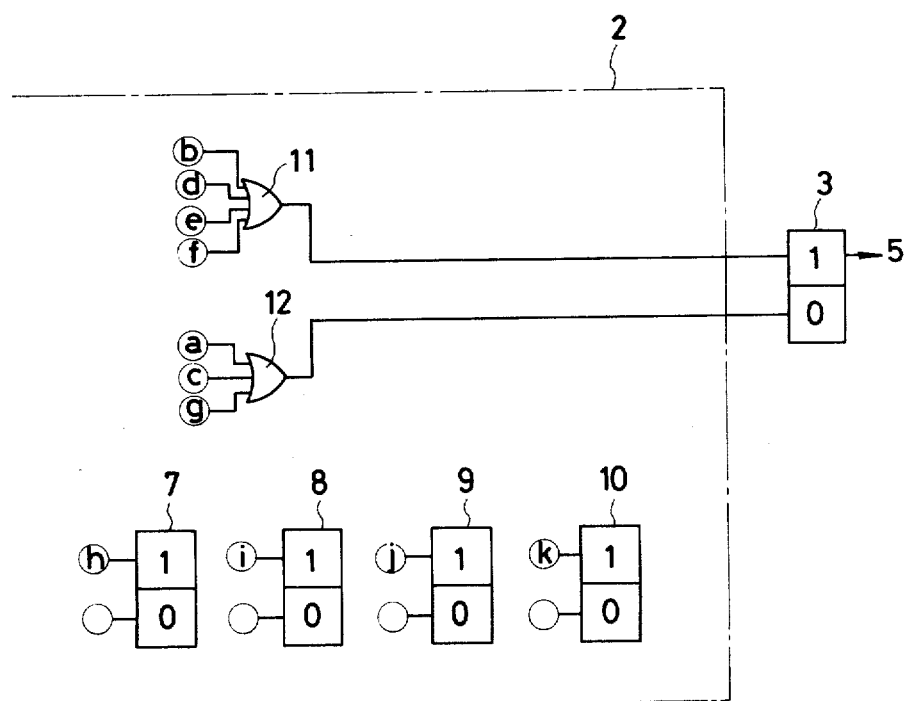
FIG. 3 is a detailed block diagram of an essential part of the operation control circuit included in the confirmation sound generation system of FIG. 1.

After completion of the introduction of the numeral information A, the function key ⊞ is actuated. A micro-order ⓗ is developed to set a flip-flop 7 included in the operation control circuit 2 as shown in FIGS. 2(B) and 3. The set output of the flip-flop 7 controls the addition calculation. Since the flip-flop 3 is already placed in the set condition, the confirmation sound is generated from the sound generator 6 upon actuation of the function key ⊞ .

The operation control circuit 2 further includes a flip-flop 8 for controlling the subtraction calculation, a flip-flop 9 for controlling the multiplicity calculation, and a flip-flop 10 for controlling the division calculation. The flip-flops 8, 9 and 10 are set by micro-orders ⓘ, ⓙ and ⓚ, respectively, which are developed when the function keys ⊟ , ⊠ and ⊡ are actuated.

Thereafter, the numeral information B should be introduced. In the case where the function key ⅔ is erroneously actuated without introducing the numeral information B, the determination unit determines whether the flip-flop 7 or 8 is in the set condition. In this example, the flip-flop 7 is in the set condition and, hence, the program is advanced to check whether the ⅔ key is actuated immediately after introduction of the numeral information. In this example, the function key ⊞ is actuated immediately before the actuation of the ⅔ key and, therefore, a micro-order ⓖ is developed to reset the flip-flop 3. Accordingly, the confirmation sound is not generated from the sound generator 6 upon actuation of the ⅔ key, thereby indicating that the actuation of the ⅔ key is ineffective.

With this indication, the operator recognizes that he has forgot to introduce the numeral information B in advance. Then, the operator introduces the numeral information B by utilizing the numeral keys included in the key input unit 1 and, thereafter, actuates the ⅔ key.

In this case, the ⅔ key is actuated immediately after the introduction of the numeral information B, and therefore, a micro-order ⓕ is developed to set the flip-flop 3. That is, the confirmation sound is generated from the sound generator 6 to indicate the effective key input operation. Under these conditions, the add-on calculation is conducted, and the calculation result (A + A·B/b 100) is displayed on the display unit.

The above-mentioned micro-orders ⓑ, ⓓ, ⓔ and ⓕ are applied to an OR gate 11 included in the operation control circuit 2. The output signal of the OR gate 11 is applied to the set input terminal of the flip-flop 3. The microorders ⓐ, ⓒ and ⓖ are applied to the reset input terminal of the flip-flop 3 through an OR gate 12 included in the operation control circuit 2.

The invention being thus described, it will be obvious that the same may be varied in many ways. Such variations are not to be regarded as a departure from the spirit and scope of the invention, and all such modifications are intended to be included with the scope of the following claims.

What is claimed is:

1. A confirmation sound generation system for an electronic apparatus which includes a key input means for conducting key input operations and thereby introducing desired information into said electronic apparatus, said confirmation sound generation system comprising:

determination means for determining whether the conducted key input operations are effective or ineffective; and sound generation means responsive to the determination made by said determination means for developing a confirmation sound when said determination means determines that said conducted key input operations are effective.

2. The confirmation sound generation system of claim 1, wherein said key input means comprises a keyboard panel including a plurality of key input switches.

3. The confirmation sound generation system of claim 1, wherein said sound generation means inhibits the development of said confirmation sound when said determination means determines that said conducted key input operations are ineffective.

4. An electronic calculator comprising a key input means having a plurality of key switches for introducing desired information into the electronic calculator, an arithmetic calculation circuit for conducting an arithmetic calculation in response to the information introduced through the key input means, and a confirmation sound generation system for generating a confirmation sound upon actuation of said key switches of said key input means, said electronic calculator further comprising:

determination means for determining whether actuation of at least one of said key switches is effective or ineffective, and developing an affirmative determination output signal when actuation of at least one of said key switches is effective, said affirmative determination output signal energizing said confirmation sound generation system.

5. The electronic calculator of claim 4, wherein said confirmation sound generation system comprises:

sound signal generator means for developing a first sound signal of a predetermined frequency in response to actuation of one of said key switches in said key input means;

control means responsive to said affirmative determination output signal from said determination means for developing a second sound signal when said affirmative determination output signal is received from said determination means; and sound generator means responsive to said first and second sound signals for developing said confirmation sound in response to said first and second sound signals.

6. The electronic calculator of claim 5, wherein said control means comprises:

flip-flop means responsive to said affirmative determination output signal for generating said second sound signal in response to energization by said affirmative determination output signal; and AND gate means connected to receive said second sound signal from said flip-flop means and said first sound signal from said sound signal generator means for developing an output signal in response to the concurrent energization of said AND gate means by both said first and second sound signal, said output signal from said AND gate means being applied to said sound generator means to activate said sound generator to generate said confirmation sound.

7. The electronic calculator of claim 6, wherein said second sound signal comprises a set signal from said flip-flop means, said determination means developing a reset signal for resetting said flip-flop means when actuation of at least one of said key switches is ineffective, said AND gate means inhibiting the development of said confirmation sound by said sound generator means in response to the resetting of said flip-flop means by said determination means.

* * * * *